(12) United States Patent
Ohno et al.

(10) Patent No.: US 7,521,025 B2
(45) Date of Patent: Apr. 21, 2009

(54) HONEYCOMB STRUCTURAL BODY

(75) Inventors: Kazushige Ohno, Ibi-gun (JP);
Masafumi Kunieda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 340 days.

(21) Appl. No.: 10/514,560

(22) PCT Filed: Jun. 10, 2004

(86) PCT No.: PCT/JP2004/008129

§ 371 (c)(1),
(2), (4) Date: Jun. 29, 2005

(87) PCT Pub. No.: WO2005/000445

PCT Pub. Date: Jan. 6, 2005

(65) Prior Publication Data

US 2005/0266991 A1    Dec. 1, 2005

(30) Foreign Application Priority Data

Jun. 10, 2003  (JP) .............................. 2003-165588
Jul. 15, 2003  (JP) .............................. 2003-197385

(51) Int. Cl.
*B01D 50/00* (2006.01)
*B01D 39/06* (2006.01)
*B01D 46/00* (2006.01)
*F01N 3/02* (2006.01)

(52) U.S. Cl. ....................... 422/168; 422/177; 422/180; 55/523; 55/282.3; 55/385.3; 55/483; 55/302; 428/304.4; 428/327; 428/116; 428/117; 428/118; 95/14; 95/278; 60/311

(58) Field of Classification Search ................. 422/144, 422/147, 145, 177, 180, 168; 210/788, 512.2, 210/787; 208/161, 113, 126, 153; 55/1, 55/346, 342, 343, 345, 349, 459.1, 459.3, 55/459.4, 460, 261, 434, 474, 523, 282.3, 55/385.3, 483, 302, 282.2, DIG. 10, DIG. 30, 55/484, 482; 209/144, 211; 428/304.4, 327, 428/116, 117, 118; 95/14, 278; 60/311

See application file for complete search history.

(56) References Cited

U.S. PATENT DOCUMENTS 3,233,697 A    2/1966   Slayter et al.

(Continued)

FOREIGN PATENT DOCUMENTS

EP    0 369 163    5/1990

(Continued)

OTHER PUBLICATIONS

Machine translation of Japanese Publication No. JP 08-012460.*

(Continued)

*Primary Examiner*—Walter D Griffin
*Assistant Examiner*—Huy-Tram Nguyen
(74) *Attorney, Agent, or Firm*—Oblon, Spivak, McClelland, Maier & Neustadt, P.C.

(57) ABSTRACT

An object of the present invention is to provide a honeycomb structural body for use in a filter, which can be provided with a large amount of catalyst, can suppress an increase in pressure loss upon collecting particulates, can have a high particulate collecting capability and can efficiently carry out a regenerating process and a toxic gas purifying process. The honeycomb structural body of the present invention is a pillar-shaped honeycomb structural body that is mainly composed of inorganic fibers and has a structure in that a large number of through holes are placed in parallel with one another in the length direction with a partition wall interposed therebetween. Herein, the inorganic fibers, which form the honeycomb structural body, are arranged in such a manner that more fibers are aligned along a face perpendicular to the forming direction of the through holes rather than aligned along a face in parallel with the forming direction of the through holes.

18 Claims, 8 Drawing Sheets

U.S. PATENT DOCUMENTS

| | | | |
|---|---|---|---|
| 3,785,781 A | | 1/1974 | Hervert et al. |
| 4,293,357 A | * | 10/1981 | Higuchi et al. ............ 156/89.22 |
| 4,560,478 A | * | 12/1985 | Narumiya .................... 210/496 |
| 4,652,286 A | * | 3/1987 | Kusuda et al. ................. 55/523 |
| 4,824,711 A | * | 4/1989 | Cagliostro et al. ........... 428/116 |
| 5,026,611 A | | 6/1991 | Usui et al. |
| 5,098,455 A | * | 3/1992 | Doty et al. ..................... 55/523 |
| 5,415,715 A | * | 5/1995 | Delage et al. ................ 156/197 |
| 5,446,264 A | | 8/1995 | Kondo et al. |
| 5,497,620 A | * | 3/1996 | Stobbe ......................... 60/303 |
| 5,514,347 A | | 5/1996 | Ohashi et al. |
| 5,573,919 A | * | 11/1996 | Kearns et al. ................. 435/7.9 |
| 5,693,230 A | * | 12/1997 | Asher ......................... 210/650 |
| 5,914,187 A | | 6/1999 | Naruse et al. |
| 5,930,994 A | | 8/1999 | Shimato et al. |
| 6,165,244 A | * | 12/2000 | Choi ............................ 55/527 |
| 6,217,831 B1 | * | 4/2001 | Suzuki et al. ................ 422/177 |
| 6,267,898 B1 | * | 7/2001 | Fukuda et al. ............... 210/767 |
| 6,387,144 B1 | * | 5/2002 | Jaroszczyk et al. ............ 55/524 |
| 6,447,564 B1 | | 9/2002 | Ohno et al. |
| 6,565,630 B2 | | 5/2003 | Ohno et al. |
| 6,669,751 B1 | | 12/2003 | Ohno et al. |
| 6,703,103 B2 | * | 3/2004 | Tanaka et al. ................ 428/116 |
| 6,764,527 B2 | | 7/2004 | Ishihara et al. |
| 6,770,116 B2 | | 8/2004 | Kojima |
| 7,090,714 B2 | | 8/2006 | Otsubo et al. |
| 2001/0010153 A1 | * | 8/2001 | Setoguchi et al. ............. 60/297 |
| 2002/0078669 A1 | * | 6/2002 | Shimoda et al. ............... 55/527 |
| 2002/0141912 A1 | | 10/2002 | Murrell et al. |
| 2003/0000188 A1 | * | 1/2003 | Harada et al. ................. 55/523 |
| 2003/0089092 A1 | * | 5/2003 | Bause et al. ................... 55/524 |
| 2004/0031264 A1 | | 2/2004 | Kojima |
| 2004/0033175 A1 | | 2/2004 | Ohno et al. |
| 2004/0055265 A1 | | 3/2004 | Ohno et al. |
| 2004/0161596 A1 | | 8/2004 | Taoka et al. |
| 2004/0223892 A1 | | 11/2004 | Kojima |
| 2005/0011174 A1 | | 1/2005 | Hong et al. |
| 2005/0016140 A1 | | 1/2005 | Komori et al. |
| 2005/0016141 A1 | | 1/2005 | Hong et al. |
| 2005/0266991 A1 | | 12/2005 | Ohno et al. |
| 2007/0289275 A1 | | 12/2007 | Ohno et al. |
| 2008/0083201 A1 | | 4/2008 | Oya et al. |

FOREIGN PATENT DOCUMENTS

| | | | |
|---|---|---|---|
| EP | 1 125 704 A1 | | 8/2001 |
| EP | 1 142 619 | | 10/2001 |
| EP | 1 231 363 A2 | | 8/2002 |
| EP | 1 262 641 A1 | | 12/2002 |
| EP | 1 375 849 A2 | | 1/2004 |
| EP | 1 419 816 A1 | | 5/2004 |
| EP | 1 520 614 A1 | | 4/2005 |
| JP | 4-2673 | | 1/1992 |
| JP | 5-306614 | | 11/1993 |
| JP | 6-182228 | | 7/1994 |
| JP | 06-294313 | | 10/1994 |
| JP | 7-213835 | | 8/1995 |
| JP | 8-12460 | | 1/1996 |
| JP | 08028246 A | * | 1/1996 |
| JP | 08028248 A | * | 1/1996 |
| JP | 8-290963 | | 11/1996 |
| JP | 10-249968 | | 9/1998 |
| JP | 10-263343 | | 10/1998 |
| JP | 2001-252529 | | 9/2001 |
| JP | 2002-239345 | | 8/2002 |
| JP | 2002-336627 | | 11/2002 |
| JP | 2002-349230 | | 12/2002 |
| JP | 2003-1029 | | 1/2003 |
| JP | 2003-1067 | | 1/2003 |
| KR | 2001-0080918 | | 8/2001 |
| WO | 03/068363 | | 8/2003 |

OTHER PUBLICATIONS

Machine translation of JP 08-028246 A.*
Machine translation of JP 08-28248 A.*
Translation of Tables 2, 3, 4, 5 and Paragraph [0084] of JP-08-012460 A—Dec. 4, 2008.*
U.S. Appl. No. 11/363,173.
U.S. Appl. No. 11/563,512.
U.S. Appl. No. 11/927,134, Oya, et al.

* cited by examiner (a)

(b)

(a)  (b)

|—————|
50 μm

|—————|
50 μm (a)

(b)

HONEYCOMB STRUCTURAL BODY

TECHNICAL FIELD

This application claims benefit of priority to Japanese Patent Application No. 2003-165588, filed on Jun. 10, 2003, and Japanese Patent Application No. 2003-197385, filed on Jul. 15, 2003, the contents of which are incorporated by reference herein.

The present invention relates to a honeycomb structural body used for the purpose of removing particulates and the like in exhaust gases discharged from an internal combustion engine such as a diesel engine or the like.

BACKGROUND ART

Recently, particulates such as soot, that are contained in exhaust gases discharged from internal combustion engines of vehicles, such as buses, trucks and the like, and construction machines and the like, have raised serious problems as those particulates are harmful to the environment and the human body. Conventionally, there have been proposed various filters used for collecting particulates in exhaust gases to purify the exhaust gases, and there have also been proposed filters having a honeycomb structure.

FIG. 4 is a perspective view that shows one type of filter having a honeycomb structure of this type.

This honeycomb filter 60, which is configured as a honeycomb structural body made of silicon carbide and the like, has a structure in that a plurality of square-pillar shaped porous ceramic members 70 are combined with one another through a sealing material layer 64 that serves as an adhesive to configure a ceramic block 65, and a sealing material layer 63 is also formed on the circumference of this ceramic block 65.

FIG. 5(a) is a perspective view that schematically shows the porous ceramic member constituting the honeycomb filter shown in FIG. 4, and FIG. 5(b) is a cross-sectional view taken along line B-B of the porous ceramic member shown in FIG. 5(a).

The porous ceramic member 70 has a honeycomb structure in which a partition wall 73, which separates a large number of through holes 71 placed in parallel with one another in the length direction from one another, functions as a filter.

In other words, as shown in FIG. 5(b), each of the through holes 71, formed in the porous ceramic member 70, is sealed with a sealing member 72 at one of ends on its exhaust gas inlet side or exhaust gas outlet side, so that exhaust gases that have entered one through hole 71 are discharged from another through hole 71 after having necessarily passed through the partition wall 73 that separates the through holes 71 from one another.

Here, the sealing material layer 63 formed on the circumference is provided for the purpose of preventing exhaust gases from leaking from the peripheral portion of the ceramic block 65 when the honeycomb filter 60 is installed in an exhaust passage of an internal combustion engine.

When the honeycomb filter 60 having such a structure is installed in the exhaust passage of the internal combustion engine, particulates in exhaust gases discharged from the internal combustion engine are captured by the partition wall 73 upon passing through the honeycomb filter 60, so that the exhaust gases are purified.

With respect to the filters having the honeycomb structure, in addition to the structure that a plurality of porous ceramic members are combined with one another, those filters formed as a single integral ceramic body made of cordierite or the like as a whole, those honeycomb filters formed through an extrusion-molding process by using inorganic fibers made of alumina, silica, mullite or the like, and those honey comb filters that are formed by subjecting an inorganic sheet, made of inorganic fibers through a paper-making process, or a metal sheet to a corrugating process into a roll shape have been known (for example, see Patent Documents 1, 2 and 3).

The honeycomb filters having the above-mentioned structures are superior in heat resistance, and particulate burning and removing processes (hereinafter, referred to as a regenerating process), and the like are easily carried out thereon; therefore, these honeycomb filters are used for various large-size vehicles, diesel-engine-installed vehicles and the like.

Moreover, there have been known filters, which collect particulates in exhaust gases and are also capable of purifying toxic exhaust gases such as CO, HC, NOx and the like. In these filters, a catalyst used for purifying exhaust gases is adhered to a portion (through holes and the like) functioning as a filter.

In the honeycomb structural body to which the catalyst is adhered, since particulates are deposited on the catalyst, active energy, required for burning particulates, is reduced by the catalyst, so that particulates can be burned even at low temperatures. Therefore, conventionally, attempts have been made to burn particulates at low temperatures and improve the purifying performance for exhaust gases by improving dispersibility of the catalyst to increase reaction sites.

In the above-mentioned filter using a catalyst, the regenerating and purifying processes are carried out by using the following two kinds of methods.

In a first method, although the purifying process for toxic gases in exhaust gases is continuously carried out, the regenerating process is not started until the collected particulates have reached a certain amount of deposition. After having reached the amount of deposition, the regenerating process is carried out to remove the particulates, and particulates are again collected. Thus, these processes are repeated several times.

In a second method, while the purifying process for toxic gases in exhaust gases is continuously carried out, the burning and removing processes of particulates are also carried out continuously, so that the particulates are successively burned without being deposited.

In order to exert efficient reactions at a low pressure loss by using these methods, it is preferable to increase reaction sites between particulates and the catalyst; therefore, it is considered to be preferable that the specific surface area of the honeycomb structural body be increased.

In this case, however, when a method is adopted in which the specific surface area of the honeycomb structural body is expanded by increasing the number of through holes per unit cross sectional area, with the cross sectional area of the through holes of the honeycomb structural body being made smaller, the small cross-sectional area of the through hole makes it difficult for exhaust gases to flow through it to cause a high pressure loss, failing to provide a practical method.

Another effective method has been proposed in which the density of the wall portion constituting the filter is lowered to increase the porosity, so that a large number of open pores are included therein; thus, even pore portions in deeper layers of the filter wall portion are allowed to collect particulates so as to make the particulates in contact with the catalyst located inside the wall portion.

However, when the above-mentioned methods are used in the above-mentioned filters, the strength of the filer becomes lower. In particular, in the case of the filter disclosed in Patent Document 1, the strength of the filter becomes considerably low. For this reason, upon burning and removing collected particulates (hereinafter, referred to as a regenerating process), the filter of this type is likely to be suffered from a great temperature difference in the length direction of the filter accompanied with the burning process of the particulates, resulting in damages such as cracks in the filter due to the subsequent thermal stress. Consequently, the above-mentioned filters tend to lose functions as the filter.

Moreover, in order to effectively utilize exhaust heat generated from the engine so as to carry out regenerating and purifying processes, the filter is desirably installed immediately under the engine; however, the installation space is extremely limited. For this reason, the filter needs to be formed into a complex shape; however, it is very difficult to form the conventional filter into a complex shape.

Furthermore, laminated filters have also been proposed; however, these filters are strengthened in toughness by adding ceramic fibers to a ceramic material (clay), lacking in the idea of realizing high porosity (see Patent Document 4).

Patent Document 1: JP-A 06-182228 (1994)
Patent Document 2: JP-A 04-2674 (1992)
Patent Document 3: JP-A 2001-252529
Patent Document 4: JP-A 08-12460 (1996)

DISCLOSURE OF THE INVENTION

Problems to be Solved by the Invention

The present invention has been made to solve the above-mentioned problems, and its object is to provide a honeycomb structural body which can support a large amount of catalyst, suppress an increase in pressure loss upon collecting particulates, and effectively carry out a regenerating process and/or a purifying process for toxic gases.

Means for Solving the Problems

According to a first aspect of the present invention, provided is a pillar-shaped honeycomb structural body that is mainly composed of inorganic fibers and has a structure in that a large number of through holes are placed in parallel with one another in the length direction with a partition wall interposed therebetween, wherein the inorganic fibers, which constitute the honeycomb structural body, are arranged in such a manner that more fibers are aligned along a face perpendicular to the forming direction of the through holes rather than aligned along a face in parallel with the forming direction of the through holes.

Here, in the first aspect of the present invention, the expression "more fibers are aligned along a face perpendicular to the forming direction of the through holes rather than aligned along a face in parallel with the forming direction of the through holes" means the following. That is, as shown in FIG. 8, based upon observation on a cross section of the honeycomb structural body (a partition wall separating through holes), on assumption that: inorganic fibers 101 that are aligned while keeping an angle α of 0 to 45° with the forming direction of the through holes is defined to be "inorganic fibers that are aligned in parallel direction with the forming direction of the through holes", and that: inorganic fibers 102 that are aligned while keeping an angle α of 45 to 90° with the forming direction of the through holes is defined as "inorganic fibers that are aligned in perpendicular direction with the forming direction of the through holes", more inorganic fibers are aligned in the perpendicular direction rather than aligned in the parallel direction with the forming direction of the through holes. Here, the alignment of the inorganic fibers on the cross section of the honeycomb structural body (a partition wall separating the through holes) can be confirmed by using a scanning electron microscope (SEM) and the like.

According to a second aspect of the present invention, provided is a pillar-shaped honeycomb structural body that is mainly composed of inorganic fibers and has a structure in that a plurality of through holes are placed in parallel with one another in the length direction with a partition wall interposed therebetween, wherein lamination is carried out in such a manner that the through holes are superposed on one another in the length direction.

Hereinafter, description will be given of the honeycomb structural bodies according to the first and second aspects of the present invention.

Each of the honeycomb structural bodies according to the first and second aspects of the present invention has a structure in that a large number of (or a plurality of) through holes are placed in parallel with one another in the length direction. These through holes may be formed by normal through holes without sealed ends, or may include through holes with either one of ends being sealed (hereinafter, referred to as a bottomed hole).

In the case where the through holes are normal through holes without sealed ends, the honeycomb structural body does not function as a filter for collecting particulates; however, by allowing a catalyst to adhere to the portion including the through holes, the honeycomb structural body is capable of functioning as a purifying device for toxic gases.

In contrast, in the case where the large number of through holes are prepared as bottomed holes with either one of ends being sealed, the honeycomb structural body functions as a filter used for collecting particulates, and when a catalyst is further adhered thereto, it functions as a filter for collecting particulates and as a purifying device for toxic gases.

Hereinafter, description will be mainly given of a honeycomb filter that functions as a filter for collecting particulates and as a purifying device for toxic gases; however, as described above, the first and second honeycomb structural bodies may serve simply as a filter, or may function as a purifying device for toxic gases.

Since the honeycomb structural bodies according to the first and second aspects of the present invention use inorganic fibers as a main constituent material, it is possible to achieve a honeycomb structural body having sufficient strength with a high porosity.

Here, the expression, "inorganic fibers are used as a main constituent material", means that more than half of the constituent materials are composed of materials with the shape of inorganic fibers remaining, and the rest half of the constituent materials are composed of an inorganic binder, an organic binder and the like.

Moreover, in the inorganic fibers constituting the honeycomb structural body according to the first aspect of the present invention, more fibers are aligned along the face perpendicular to the forming direction of the through holes rather than aligned along the face in parallel with the forming direction of the through holes. Therefore, since exhaust gases are allowed to easily pass through the wall portion, it becomes possible to reduce the initial pressure loss, and also to allow particulates to pass through deeper layers inside the wall portion; thus, it is possible to prevent formation of cake layers on the surface of the partition wall, and consequently to suppress an increase in the pressure loss upon collecting particulates. Moreover, since a catalyst is adhered to the inorganic fibers serving as a constituent material prior to forming the honeycomb structural body, the catalyst is adhered to the honeycomb structural body in a manner so as to be dispersed more uniformly. As a result, the honeycomb structural body according to the first aspect of the present invention makes it possible to improve the purifying function for toxic gases.

In the case where a catalyst is adhered to the inorganic fibers, as the rate of: fibers that are aligned in a direction close to a perpendicular direction to the forming direction of the through holes; to those fibers that are aligned on a face in parallel with the forming direction of the through holes increases, the rate of exhaust gases flowing in parallel with the aligned direction of the inorganic fibers increases; therefore, the chance (possibility) of particulates coming into contact with the catalyst deposited on the inorganic fibers increases, thereby making it possible to easily burn the particulates.

Moreover, since a small thermal capacity can be achieved because of high porosity, it is possible to heat the catalyst to an active temperature (for regenerating and purifying processes) thereof in an early stage, by using exhaust heat emit from the internal combustion engine. In particular, this structure is more advantageous when the filter is placed right under the engine so as to effectively utilize the exhaust heat therefrom.

Furthermore, in the honeycomb structural bodies according to the first and second aspects of the present invention, since a catalyst can be applied to inorganic fibers that serve as a constituent material prior to the formation thereof, the catalyst is adhered thereto in a more uniformly dispersed state. Since each of these structural bodies has a laminated structure in the length direction, the laminated structure can be formed with the catalyst dispersibility and the kinds of catalyst with respect to the length direction being freely combined in accordance with the use of the structural bodies. Consequently, the honeycomb structural bodies according to the first and second aspects of the present invention make it possible to effectively improve the regenerating process and the purifying function for toxic gases.

In the case where the catalyst is placed right under the engine, the filter space is extremely limited, and a complex filter shape is required; however, since the honeycomb structural body according to the second aspect of the present invention has the laminated structure in the length direction, it is possible to easily address these problems without causing wasteful use of materials.

Moreover, upon carrying out the regenerating process, a great temperature difference is exerted in the filter length direction accompanied with the burning process of the particulates, and the subsequent large thermal stress is imposed on the filter; however, since the honeycomb structural body according to the second aspect of the present invention has the laminated structure in the length direction, even when such a great temperature difference is imposed on the entire filter, the temperature difference imposed on each of respective units is small, and the subsequent thermal stress becomes smaller. Thus, the honeycomb structural body becomes less likely to be suffered from damages. In particular, although the above-mentioned filter having a complex shape tends to become weaker with respect to a thermal stress, the honey comb structural body according to the second aspect of the present invention becomes less likely to be suffered from damages such as cracks because of the above-mentioned reasons, even when it has a complex shape.

Here, in the honeycomb structural body according to the second aspect of the present invention, it is possible to easily form irregularities on the surface of the wall portion of the honeycomb structural body by laminating different units alternately or randomly. Further, the irregularities formed on the surface of the wall portion make it possible to increase the filtering area and consequently to reduce a pressure loss upon collecting particulates. Moreover, the irregularities allow the exhaust gas flow to form a turbulent flow, making it possible to reduce the temperature difference in the filter and consequently to prevent damages such as cracks due to thermal stress. Here, in the first aspect of the present invention also, when the through holes have a laminated structure, the same functions and effects as those according to the second aspect of the present invention can be obtained.

Moreover, in a manufacturing method for the honeycomb structural body according to the third aspect of the present invention, sheets each of which is mainly composed of inorganic fibers and has through holes formed therein are laminated so that the through holes are superposed on one another.

By using the manufacturing method for the honeycomb structural body according to the third aspect of the present invention, the honeycomb structural bodies according to the first and second aspects of the present invention can be preferably manufactured.

Effects of the Invention

The honeycomb structural body according to the first aspect of the present invention has a structure in which more inorganic fibers are aligned along a face perpendicular to the forming direction of the through holes rather than alinged along a face in parallel with the forming direction of the through holes so that by increasing the porosity, more catalyst is adhered to the honeycomb structural body including the inside of the honeycomb structural body to improve the purifying function for exhaust gases; thus, it becomes possible to reduce the initial pressure loss, to filter particulates at deeper layers inside the wall portion, and consequently to prevent a cake layer being formed on the surface of the wall portion as well as preventing an increase in the pressure loss upon collecting particulates. Here, since the honeycomb structural body according to the first aspect of the present invention uses inorganic fibers as its constituent material, it is possible to maintain sufficient strength even when the porosity is increased.

When the rate of inorganic fibers aligned in a direction close to the perpendicular direction to the forming direction of the through holes to inorganic fibers aligned on a face in parallel with the forming direction of the through holes increases, the rate of exhaust gases flowing in parallel with the aligning direction of the inorganic fibers is increased so that the chance of particulates coming into contact with the catalyst deposited on the inorganic fibers increases, thereby making it possible to easily burn the particulates.

Moreover, by making the porosity higher, the thermal capacity becomes smaller so that the temperature of the honeycomb structural body is easily raised to an active temperature for the catalyst by utilizing exhaust heat emit by the engine. Thus, it becomes possible to effectively utilize the exhaust heat for the regenerating process and purifying process.

Furthermore, in the honeycomb structural body according to the second aspect of the present invention, since inorganic fibers are used as a main constituent material, it is possible to achieve a honeycomb structural body having sufficient strength with a high porosity. Therefore, it becomes possible to reduce the pressure loss, to increase the chance of particulates coming into contact with the catalyst adhered to the inorganic fibers and consequently to easily burn the particulates. Since the thermal capacity is small, it is possible to heat the catalyst to an active temperature (for regenerating and purifying processes) thereof in an early stage, by using exhaust heat emit from the internal combustion engine. In particular, this structure is more advantageous when the filter is placed right under the engine so as to effectively utilize the exhaust heat therefrom.

In the case where the catalyst is placed right under the engine, the filter space is extremely limited, and a complex filter shape is sometimes required; however, since the honeycomb structural body according to the second aspect of the present invention has the laminated structure in the length direction, it is possible to easily address this problem without causing wasteful use of materials.

Moreover, upon carrying out the regenerating process, a great temperature difference is exerted in the filter length direction accompanied with the burning process of the particulates, and the subsequent large thermal stress is imposed on the filter; however, since the honeycomb structural body according to the second aspect of the present invention has the laminated structure in the length direction, even when such a great temperature difference is imposed on the entire filter, the temperature difference imposed on each of respective units is small, and the subsequent thermal stress becomes smaller. Thus, the honeycomb structural body becomes less likely to be suffered from damages. In particular, although the above-mentioned filter having a complex shape tends to become weaker with respect to a thermal stress, the honeycomb structural body according to the second aspect of the present invention becomes less likely to be suffered from damages such as cracks because of the above-mentioned reasons, even when it has a complex shape.

Furthermore, in the honeycomb structural bodies according to the second aspect of the present inventions, since a catalyst can be applied to inorganic fibers that serve as a constituent material prior to the formation thereof, the catalyst can be adhered thereto in a more uniformly dispersed state. Since the structural body has a laminated structure in the length direction, the laminated structure can be formed with the catalyst dispersibility and the kinds of catalyst with respect to the length direction being freely combined in accordance with the use of the structural bodies. Consequently, the honeycomb structural bodies according to the second aspect of the present invention makes it possible to effectively improve the regenerating process and the purifying function for toxic gases.

In the honeycomb structural body according to the second aspect of the present invention, it is possible to easily form irregularities on the surface of the wall portion of the honeycomb structural body by laminating different units alternately or randomly. Consequently, the irregularities formed on the surface of the wall portion make it possible to increase the filtering area and consequently to reduce a pressure loss upon collecting particulates. Moreover, the irregularities allow the exhaust gas flow to form a turbulent flow, making it possible to reduce the temperature difference in the filter and consequently to prevent damages such as cracks due to thermal stress.

Moreover, the manufacturing method for a honeycomb structural body according to the third aspect of the present invention makes it possible to desirably manufacture the honeycomb structural bodies according to the first and second aspects of the present invention.

EMBODIMENTS OF THE INVENTION

First, description will be given of embodiments of a honeycomb structural body according to the first aspect of the present invention.

A honeycomb structural body in accordance with one embodiment according to the first aspect of the present invention is a pillar-shaped honeycomb structural body that is mainly composed of inorganic fibers and has a structure in that a large number of through holes, either one end of which are sealed, (hereinafter, referred to as bottomed holes) are placed in parallel with one another in the length direction with a partition wall interposed therebetween, wherein the inorganic fibers, which form the honeycomb structural body, are arranged in such a manner that more fibers are aligned along a face perpendicular to the forming direction of the bottomed holes rather than aligned along a face in parallel with the forming direction of the bottomed holes.

The honeycomb structural body according to the first aspect of the present invention is mainly composed of inorganic fibers.

With respect to the inorganic fibers, examples thereof include oxide ceramics such as silica-alumina, mullite, alumina and silica, nitride ceramics such as aluminum nitride, silicon nitride, boron nitride and titanium nitride, and carbide ceramics such as silicon carbide, zirconium carbide, titanium carbide, tantalum carbide and tungsten carbide.

Each of these may be used alone or two or more kinds of these may be used in combination.

With respect to the fiber length of the inorganic fibers, a preferable lower limit value is set to 0.1 mm and a preferable upper limit value is set to 100 mm, more preferably, the lower limit value is set to 0.5 mm and the upper limit value is set to 50 mm. A preferable lower limit value of the inorganic fiber length is set to 1 μm, and a preferable upper limit value thereof is set to 30 μm, more preferably, the lower limit value is set to 2 μm and the upper limit value is set to 20 μm.

In addition to the above-mentioned inorganic fibers, the honeycomb structural body may contain a binder used for combining the inorganic fibers with one another so as to maintain a predetermined shape.

With respect to the above-mentioned binder, not particularly limited, inorganic glass, such as silicate glass, silicate alkali glass and borosilicate glass, alumina sol, silica sol, titania sol and the like may be used.

With respect to the content of the binder, a preferable lower limit value is set to 5 wt % and a preferable upper limit value is set to 50 wt %; more preferably, the lower limit value is set to 10 wt % and the upper limit value is set to 40 wt %; most preferably, the upper limit value is set to 20 wt %.

With respect to the apparent density of the honeycomb structural body, a preferable lower limit value is set to 0.05 $g/cm^3$ and a preferable upper limit value is set to 1.00 $g/cm^3$; more preferably, the lower limit value is set to 0.10 $g/cm^3$ and the upper limit value is set to 0.50 $g/cm^3$.

With respect to the porosity of the honeycomb structural body, a preferable lower limit value is set to 60 vol % and a preferable upper limit value is set to 98 vol %; more preferably, the lower limit value is set to 80 vol % and the upper limit value is set to 95 vol %.

The porosity exceeding 60 vol % allows the particulates to penetrate the honeycomb structural body deeper to be easily filtered so that the particulates are easily made in contact with the catalyst supported the inside of the wall; thus, it becomes possible to improve the reactivity. However, the porosity exceeding 98% tends to cause insufficient strength.

Here, the apparent density and porosity can be measured through known methods, such as a weighting method, Archimedes method and a measuring method using a scanning electron microscope (SEM).

On the inorganic fibers constituting the honeycomb structural body, a catalyst made from a noble metal, such as platinum, palladium and rhodium, may be supported. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

When such a catalyst is supported thereon, the filter using the honeycomb structural body of the present invention is allowed to function as a filter capable of collecting particulates in exhaust gases, and also to function as a catalyst converter for purifying CO, HC, NOx and the like contained in exhaust gases.

The honeycomb filter according to the first aspect of the present invention in which the above-mentioned catalyst is supported is allowed to function as a gas purifying device in the same manner as the conventionally known DPFs (Diesel Particulate Filters) with catalyst. Therefore, the detailed explanation of the case in which the honeycomb filter according to the first aspect of the present invention also serves as a catalyst converter is omitted.

Referring to the figures, description will be given of embodiments according to the first aspect of the present invention.

The honeycomb structural body may contain a slight amount of inorganic particles and metal particles. With respect to the inorganic particles, examples thereof include carbides, nitrides and oxides. Specific examples thereof include inorganic powder made from silicon carbide, silicon nitride, boron nitride, alumina, silica, zirconia, titania or the like. With respect to the metal particles, examples thereof include metallic silicon, aluminum, iron, titanium and the like. Each of these may be used alone, or two or more kinds of these may be used in combination.

FIG. 1(a) is a schematic perspective view that shows a specific example of a honeycomb structural body according to the first aspect of the present invention, and FIG. 1(b) is a cross-sectional view taken along line A-A of FIG. 1(a).

As shown in FIG. 1(a), a honeycomb structural body 10 has a columnar structure in which a large number of bottomed holes 11, with either one of ends being sealed, are placed in parallel with one another in the length direction with a partition wall 13 interposed therebetween so as to function as a filter.

In other words, as shown in FIG. 1(b), each of the bottomed holes 11 is sealed at either one of ends of its exhaust gas inlet side or outlet side so that exhaust gases that have entered one bottomed hole 11 are discharged from another bottomed hole 11 after having always passed through the partition wall 13 that separates the bottomed holes 11; thus, the honeycomb structural body is allowed to function as a filter.

With respect to the thickness of the wall portion, a preferable lower limit value is set to 0.2 mm and a preferable upper limit value is set to 10.0 mm; more preferably, the lower limit value is set to 0.3 mm and the upper limit value is set to 6 mm.

With respect to the density of through holes on a cross section perpendicular to the length direction of the honeycomb structural body, a preferable lower limit value is set to 0.16 number/$cm^2$ (1.0 numer/$in^2$) and a preferable upper limit value is set to 62 number/$cm^2$ (400 number/$in^2$); more preferably, the lower limit value is set to 0.62 number/$cm^2$ (4.0 number/$in^2$) and the upper limit value is set to 31 number/$cm^2$ (200 number/$in^2$).

Here, the size of the through hole is preferable set in a range from 1.4 mm×1.4 mm to 16 mm×16 mm.

The honeycomb structural body according to the first aspect of the present invention may have an integral structure as described above; alternatively, as shown in FIG. 1, it is preferably prepared as a laminated body formed by laminating sheet-shaped members 10a having a thickness in a range from 0.1 to 20 mm in the length direction.

In this case, the sheet-shaped members 10a are preferably laminated so that the through holes 11 are superposed on one another in the length direction.

Here, the expression, "the through holes 11 are superposed on one another", means that the sheet-shaped members 10 are laminated so that the corresponding through holes formed in the adjacently located sheet-shaped members are allowed to communicate with each other.

The sheet-shaped members are easily obtained through a paper-making method and the like, and by laminating them, a honeycomb structural body made of a laminated body is prepared. The laminated body may be formed by bonding the members using an inorganic bonding agent or the like, or may be formed by simply laminating the members physically. Upon manufacturing the laminated body, the sheet-shaped members are directly laminated in a casing (a cylindrical member made of metal) to be used when attached to an exhaust pipe, and a pressure is applied thereto so that a honeycomb structural body is formed. In this case, since a laminated body having a plurality of layers is initially formed, it becomes possible to prevent occurrence of cracks and the like. The forming method and laminating method for the sheet-shaped member will be described later.

In the honeycomb structural body 10 shown in FIG. 1, the shape is prepared as a column shape; however, not particularly limited to the column shape, the honeycomb structural body according to the first aspect of the present invention may have any desired pillar shape, such as an elliptical column shape and a rectangular pillar shape, and any size.

Moreover, in the case where the filter is installed right under the engine, the filter space is extremely limited, and a complex filter shape is required; however, in the case according to the first aspect of the present invention, even a complex shape, such as a filter 30 with a concave portion on one side as shown in FIG. 6(a) and a filter 40 with concave portions on two sides as shown in FIG. 6(b), can be easily formed by superposing paper-making processed sheets 30a or 40a in the length direction. Moreover, since the paper-making processed sheets 30a or 40a are superposed in the length direction, even a curved shape in the length direction and a deformed shape that is gradually changed in the length direction can be easily formed.

Here, the regenerating process of a filter using the honeycomb structural body corresponds to a burning process for particulates, and with respect to the regenerating method for the honeycomb structural body according to the first aspect of the present invention, a method in which the honeycomb structural body is heated by a heating means installed on the exhaust gas inlet side may be used, or a method in which an oxidizing catalyst is supported on the honeycomb structural body so that heat, generated by oxidation of hydrocarbon or the like in exhaust gases due to the oxidizing catalyst, is utilized to carry out the regenerating process in parallel with the purifying process for exhaust gases may be used. Moreover, another method in which a solid-state catalyst that directly oxidize particulates is placed on the filter or an oxidizing catalyst, placed on the upstream side of the filter, is used to generate $NO_2$ by oxidizing NOx so that the particulates are oxidized by using the resulting $NO_2$ may be used.

Hereinafter, description will be briefly given of an embodiment of a honeycomb structural body according to the second aspect of the present invention.

The embodiment of the honeycomb structural body according to the second aspect of the present invention is almost the same as the embodiment of the honeycomb structural body according to the first aspect of the present invention except for the following points. In other words, the honeycomb structural body according to the second aspect of the present invention has almost the same structure as that of the embodiment of the honeycomb structural body according to the first aspect of the present invention, except that the sheet-shaped members are laminated so that the through holes are always superposed on one another in the length direction, and that the inorganic fibers are not necessarily aligned in a predetermined direction. Therefore, the detailed description of the constituent features thereof is omitted.

With respect to the application of the honey comb structural body according to the first and second aspects of the present invention, although not particularly limited, it is preferably used for exhaust gas purifying devices for use in vehicles.

FIG. 3 is a cross-sectional view that schematically shows one example of an exhaust gas purifying device for use in vehicles, which is provided with each of the honeycomb structural bodies according to the first and second aspects of the present invention.

As shown in FIG. 3, an exhaust gas purifying device 200 is mainly constituted by each of honeycomb structural body 20 according to the first and second aspects of the present invention, and a casing 23 that covers the external portion of the honeycomb structural body 20; and an introducing pipe 24 that is connected to an internal combustion system such as an engine is connected to the end of the casing 23 on the side to which exhaust gases are introduced, and an exhaust pipe 25 externally coupled is connected to the other end of the casing 23. Here, in FIG. 3, arrows indicate flows of exhaust gases.

In the exhaust gas purifying device 200 having the above-mentioned arrangement, exhaust gases, discharged from the internal combustion engine such as an engine, are introduced into the casing 23 through the introducing pipe 24, and allowed to flow into the honeycomb structural body 20 and pass through the wall portion (the partition wall); thus, the exhaust gases are purified, with particulates thereof being collected in the wall portion (the partition wall), and are then discharged outside through the exhaust pipe 25.

After a large quantity of particulates have been accumulated on the wall portion (the partition wall) of the honeycomb structural body 20 to cause an increase in pressure loss, the honeycomb structural body 20 is subjected to a regenerating process by using the above-mentioned means.

Hereinafter, description will be given of a manufacturing method for a honeycomb structural body according to the third aspect of the present invention.

The manufacturing method for the honeycomb structural body of the present invention is characterized by its arrangement in which sheets, which are mainly made from inorganic fibers, and provided with through holes, are laminated so that the through holes are superposed on one another.

By using the manufacturing method for the honeycomb structural body of the present invention, it is possible to desirably form the honeycomb structural body of the first or second embodiment of the present invention.

Referring to FIG. 2, description will be given of a sequence of processes of one example of the manufacturing method for the honeycomb structural body of the present invention.

(1) Process of Applying Catalyst to Inorganic Fibers

Inorganic fibers such as alumina fibers are impregnated with a slurry of an oxide on which a catalyst made from a noble metal such as Pt is supported, and then raised from the slurry and heated to prepare inorganic fibers to which the catalyst is adhered. Here, inorganic fibers may be impregnated with a slurry containing a catalyst, and raised and heated so that the catalyst may be directly adhered to the inorganic fibers. The amount of deposition of the catalyst is preferably set in a range from 0.01 to 1 g/10 g of inorganic fibers. When the honeycomb structural body having no catalyst deposited thereon is manufactured, this process is omitted.

In this manner, in the first and second honeycomb structural bodies according to the first and second aspects of the present invention, since a catalyst is adhered to the inorganic fibers serving as a constituent material prior to forming the honeycomb structural body, the catalyst can be adhered to the honeycomb structural body in a manner so as to be dispersed more uniformly. Consequently the resulting honeycomb structural body makes it possible to improve the burning function of particulates and the purifying function for toxic gases. Here, the catalyst applying process may be carried out after sheets have been formed through a paper-making process.

(2) Process of Preparing Slurry for Paper-Making

Next, the inorganic fibers bearing the catalyst, obtained from the process (1), were dispersed in water (1 L) at a rate of 5 to 100 g, and in addition to these, 10 to 40 parts by weight of an inorganic binder such as silica sol and 1 to 10 parts by weight of an organic binder such as an acrylic latex were added to 100 parts by weight of the inorganic fibers, and to this were further added a slight amount of a coagulation agent such as aluminum sulfate and an aggregation agent such as polyacrylic amid, if necessary, and sufficiently stirred to prepare a slurry for paper-making.

With respect to the organic binder, examples thereof include methylcellulose, carboxy methylcellulose, hydroxy ethylcellulose, polyethylene glycol, phenolic resin, polyvinyl alcohol and styrene butadiene rubber.

(3) Paper-Making Process

The slurry, obtained in the process (2), was subjected to a paper-making process by using a perforated mesh in which holes having a predetermined shape are formed with mutually predetermined intervals, and the resulting matter was dried at a temperature in a range from 100 to 200° C. so that sheets obtained by paper-making process 10a, which had through holes and a predetermined thickness as shown in FIG. 2(a), were obtained. The thickness of each sheet obtained by paper-making process 10a was preferably set in a range from 0.1 to 20 mm.

According to the first and second aspects of the present invention, by using, for example, a mesh having predetermined-shaped holes formed in a staggered pattern, it is possible to obtain paper-making processed sheets 10b to be used at two ends. In other words, by using these paper-making processed sheets at the two ends, it is possible to obtain a honeycomb structural body functioning as a filter without the necessity of having to seal predetermined through holes at the two ends after forming the through holes.

(4) Laminating Process

By using a cylindrical casing 23 having a pressing member on one side as shown in FIG. 2(b), several paper-making processed sheets 10b for both ends are laminated inside the casing 23, and a plurality of inner paper-making processed sheets 10a are then laminated therein. Then, several paper-making processed sheets 10b for both ends are lastly laminated, and after having been pressed, another pressing member is also put on the other side and secured thereon so that a honeycomb structural body that has been subjected to a canning process is prepared.

In this process, the paper-making processed sheets 10a, 10b are laminated so that the through holes are superposed on one another.

In the case where the honeycomb structural body is formed by simply laminating paper-making processed sheets physically in this manner, even if a certain degree of temperature distribution occurs in the honeycomb structural body when installed in an exhaust passage, a temperature distribution per one sheet is comparatively small so that the sheets are less likely to be suffered from cracks and the like.

Here, in the case where, in the paper-making process, the inorganic fibers are aligned almost in parallel with the main face of the paper-making processed sheets upon forming the laminated body, more inorganic fibers are aligned along a face perpendicular to the forming direction of the through holes rather than alinged along a face in parallel with the forming direction of the through holes. Consequently, exhaust gases are allowed to more easily pass through the wall portion of the honeycomb structural body; thus, it becomes possible to reduce the initial pressure loss, and also to allow particulates to pass through deeper layers inside the wall portion. Therefore, it is possible to prevent formation of cake layers on the surface of the partition wall, and consequently to suppress an increase in the pressure loss upon collecting particulates.

Moreover, since the rate of exhaust gases flowing in parallel with the aligned direction of the inorganic fibers increases, the chance of the particulates coming into contact with the catalyst adhered to the inorganic fibers increases, making it possible to easily burn the particulates.

Furthermore, in the case where paper-making processed sheets, which have different dimensions in the holes, are formed so that these are laminated, the bottomed holes are allowed to form irregularities, with the result that bottomed holes having a larger surface area can be formed. Therefore, the filtering area is made larger, making it possible to reduce a pressure loss upon collecting particulates. Consequently, it becomes possible to collect more particulates. With respect to the shape of the holes, not particularly limited to a quadrangular shape (square), any desired shape, such as a triangle, a hexagon, an octagon, a dodecagon, a round shape and an elliptical shape, may be used.

EXAMPLES

Hereinafter, description will be given of the present invention in detail by way of examples; however, the present invention is not intended to be limited to these examples.

Example 1

(1) Process of Applying Catalyst to Inorganic Fibers

Alumina fibers (average fiber diameter: 5 μm, average fiber length: 0.3 mm) were impregnated with an alumina slurry bearing Pt (Pt concentration: 5 wt %) for two minutes, and then heated at 500° C. to prepare alumina fibers to which the catalyst is adhered. The amount of deposition of Pt was 0.24 g/10 g of alumina.

(2) Process of Preparing Slurry for Paper-Making

Next, the inorganic fibers obtained from the process (1) were dispersed in water (1 L) at a rate of 10 g, and in addition to these, 5 wt % of silica sol serving as an inorganic binder and 3 wt % of an acrylic latex serving as an organic binder were added thereto. Further, a slight amount of aluminum sulfate serving as a coagulation agent and polyacrylic amid serving as an aggregation agent were further added thereto, and the mixture was sufficiently stirred to prepare a slurry for paper-making.

(3) Paper-Making Process

The slurry, obtained in the process (2), was subjected to a paper-making process by using a perforated mesh having a diameter of 143.8 mm in which holes having a size of 4.5 mm×4.5 mm were formed with mutual intervals of 2 mm, and the resulting matter was dried at a temperature of 150° C. so that paper-making processed sheets $A_1$, which had holes having a size of 4.5 mm×4.5 mm were formed over the entire surface with intervals of 2 mm, and a thickness of 1 mm, were obtained.

Further, in order to obtain sheets for both ends, the same paper-making and drying processes were carried out by using a mesh in which holes having a size of 4.5 mm×4.5 mm were formed in a staggered pattern, to prepare paper-making processed sheets B.

(4) Laminating Process

A casing (cylindrical metal container) having a pressing member on one side was placed with the side to which the pressing member was attached facing down. After three of the paper-making processed sheets B had been laminated, 150 of the paper-making processed sheets $A_1$ were laminated, and three of the paper-making processed sheets were lastly laminated therein, and this was further subjected to a pressing process, and another pressing member is also put on the other side and secured thereon so that a honeycomb structural body having a length of 150 mm, made of a laminated body, was prepared. The amount of Pt deposition of this honeycomb structural body was 5 g/l.

In this process, the sheets were laminated so that the through holes are superposed on one another.

Examples 2 and 3

The same processes as Example 1 were carried out except that the amounts of deposition of Pt catalyst were changed to 0.1 g/10 g of alumina (Example 2) and 0.15 g/10 g of alumina (Example 3) to obtain honeycomb structural bodies. The amount of Pt deposition of the honeycomb structural body according to Example 2 was 2 g/l and the amount of Pt deposition of the honeycomb structural body according to Example 3 was 3 g/l.

Examples 4 and 5

The same processes as Example 1 were carried out except that the fiber lengths of alumina fibers were changed to 10 mm (Example 4) and 50 mm (Example 5) to obtain honeycomb structural bodies.

Examples 6 and 7

The same processes as Example 1 were carried out except that in place of alumina fibers, silica alumina fibers (Example 6: average fiber diameter: 3 μm, average fiber length: 1 mm) and silica alumina fibers (Example 7: average fiber diameter: 3 μm, average fiber length: 20 mm) were respectively used to obtain honeycomb structural bodies.

Example 8

The same processes as Example 1 were carried out except that paper-making processed sheets $A_2$ having the same shape as the paper-making processed sheets $A_1$ and a thickness of 2 mm and that the number of the paper-making processed sheets $A_2$ to be laminated was set to 75 to obtain a honeycomb structural body.

Example 9

The same processes as Example 1 were carried out except that paper-making processed sheets $A_3$ having the same shape as the paper-making processed sheets $A_1$ and a thickness of 15 mm and that the number of the paper-making processed sheets $A_3$ to be laminated was set to 10 to obtain a honeycomb structural body.

Example 10

The same paper-making processed sheets $A_1$ (75 sheets) as those of Example 1 were formed, and paper-making processed sheets $A_4$ (75 sheets) were formed by carrying out the same processes as those of the paper-making processed sheets $A_1$ except that the size of the holes was changed to 4.0 mm×4.0 mm; thus, the same processes as Example 1 were carried out except that these sheets were alternately laminated to obtain a honeycomb structural body.

Example 11

The same paper-making processed sheets $A_1$ (75 sheets) as those of Example 1 were formed, and paper-making processed sheets $A_5$ (75 sheets) were formed by carrying out the same processes as those of the paper-making processed sheets $A_1$ except that the size of the holes was changed to 3.5 mm×3.5 mm, and the same processes as Example 1 were carried out except that these sheets were alternately laminated to obtain a honeycomb structural body.

Comparative Example 1

The same catalyst applying process (1) to inorganic fibers and preparation process (2) for a slurry for paper-making as those of Example 1 were carried out, and the resulting slurry was subjected to a paper-making process by using mesh of 144 mm×150 mm without holes so that the resulting matter was dried at 150° C. to prepare a paper-making processed sheet C having a size of 144 mm×150 mm×2 mm. Moreover, the paper-making processed sheet C is cut into a size of 144 mm×4.5 mm×2 mm so that paper-making processed sheets D were formed.

(4) Laminating Process

The paper-making processed sheet D was bonded and stuck to the surface of the paper-making processed sheet C by using an inorganic bonding agent with its surface of 144 mm×2 mm being made in contact thereto, with intervals of 5 mm, so that a laminating sheet having a size of 144 mm×150 mm×6.5 mm was prepared. Further, these laminating sheets were bonded and laminated to each other by using an inorganic bonding agent to form a quadrangular pillar-shaped honeycomb structural body having a size of 144 mm×150 mm×145 mm.

Thereafter, the peripheral portion thereof was subjected to a cutting process so as to finally form a column shape having a diameter of 143.8 mm, and a sealing material is applied onto the periphery thereof by using an inorganic bonding agent so that a columnar honeycomb structural body with through holes each having a size of 4.5 mm×4.5 mm was obtained.

Next, after three of the paper-making processed sheets B had been laminated inside a casing (cylindrical metal container) to one end of which a pressing member had been attached, the resulting columnar honeycomb structural body was pushed and inserted therein, and three of the paper-making processed sheets B were further laminated thereon; then, lastly, another pressing member is also put on the other side of the casing and secured thereon so that a honeycomb structural body having a diameter of 143.8 mm and a length of 150 mm was prepared.

Comparative Example 2

(1) Powder of α-type silicon carbide having an average particle size of 10 μm (80 wt %) and powder of β-type silicon carbide having an average particle size of 0.5 μm (20 wt %) were wet-mixed, and to 100 parts by weight of the resulting mixture were added and kneaded 5 parts by weight of an organic binder (methyl cellulose) and 10 parts by weight of water to obtain a kneaded matter. Next, after a slight amount of a plasticizer and a lubricant had been further added and kneaded therein, the resulting mixture was extrusion-formed so that a raw formed body was formed.

Next, the above-mentioned raw formed body was dried by using a microwave drier, and after predetermined through holes had been filled with a sealing material paste having the same composition as the raw formed body, the resulting product was again dried by using a drier, and then degreased at 400° C., and sintered at 2200° C. in a normal-pressure argon atmosphere for 3 hours to manufacture a porous ceramic member, which was a silicon carbide sintered body, and had a size of 33 mm×33 mm×150 mm, the number of through holes of $3.1/cm^2$ and a thickness of the through holes of 2 mm.

(2) By using a heat resistant sealing material paste containing 19.6 wt % of alumina fibers having a fiber length of 0.2 mm, 67.8 wt % of silicon carbide particles having an average particle size of 0.6 μm, 10.1 wt % of silica sol and 2.5 wt % of carboxymethyl cellulose, a large number of the porous ceramic members were combined with one another, and this was then cut by using a diamond cutter to form a columnar ceramic block having a diameter of 141.8 mm.

Next, ceramic fibers made from alumina silicate (shot content: 3%, fiber length: 0.1 to 100 mm) (23.3 wt %), which served as inorganic fibers, silicon carbide powder having an average particle size of 0.3 μm (30.2 wt %), which served as inorganic particles, silica sol ($SiO_2$ content in the sol: 30 wt %) (7 wt %), which served as an inorganic binder, carboxymethyl cellulose (0.5 wt %), which served as an organic binder, and water (39 wt %) were mixed and kneaded to prepare a sealing material paste.

Next, a sealing material paste layer having a thickness of 1.0 mm was formed on the circumferential portion of the ceramic block by using the above-mentioned sealing material paste. Further, this sealing material paste layer was dried at 120° C. so that a columnar honeycomb structural body was manufactured. Then, Pt was adhered to this honeycomb structural body at a rate of 5 g/l by using a conventional method.

Comparative Example 3

(1) Alumina fibers (average particle size: 5 μm, average fiber length: 0.3 mm) (65 wt %), silica sol (30 wt %), an organic binder (methylcellulose) (3 wt %) and a plasticizer as well as a lubricant (1 wt % respectively) were mixed and kneaded, and the resulting mixture was extrusion-formed so that a raw formed body was formed.

Next, the above-mentioned raw formed body was dried by using a microwave drier, and after predetermined through holes had been filled with a sealing material paste having the same composition as the raw formed body, the resulting product was again dried by using a drier, and then degreased at 400° C., and sintered at 1200° C. in a normal-pressure argon atmosphere for 3 hours to manufacture a honeycomb structural body, which had a diameter of 143.8 mm x a length of 150 mm, the number of through holes of 3.1/cm² and a thickness of the partition wall of 2 mm.

(2) Thereafter, Pt was adhered to this honeycomb structural body at a rate of 5 g/l by using a conventional method (in which the honeycomb structural body is impregnated with an alumina slurry bearing Pt).

(Evaluation Method)

(1) Observation on Penetration of Particulates into Inner Portion

The same honeycomb structural bodies as those of the examples and comparative examples were manufactured except that no catalyst was deposited thereon, and each of the honeycomb structural bodies was placed in an exhaust passage of an engine so as to serve as a filter; thus, an exhaust gas purifying device was formed. Then, the engine was driven at the number of revolutions of 3000 min$^{-1}$ and a torque of 50 Nm for 10 minutes, and the resulting honeycomb structural body was cut with a face perpendicular to the length direction so that the cross sectional face was observed by using a scanning electron microscopic photograph (SEM) to confirm how deep the particulates had reached; thus, the depth to which the particulates had reached was determined. Table 2 shows the degree of inner penetration.

(2) Observation on Regenerating Process

The same honeycomb structural bodies as those of the examples and comparative examples were manufactured except that no catalyst was deposited thereon, and each of the honeycomb structural bodies was placed in an exhaust passage of an engine as a filter; thus, an exhaust gas purifying device was formed. Then, the engine was driven at the number of revolutions of 3000 min$^{-1}$ and a torque of 50 Nm until 8 g/l of particulates had been collected in the filter, and the filter was then subjected to a regenerating process to burn the particulates.

Here, in the honeycomb structural bodies of Examples 1 to 11, temperature measurements were carried out inside the filter during the regenerating process before and after the sheet located at a position 20 mm apart from the exhaust gas inlet side as well as before and after the sheet located at a position 20 mm apart from the exhaust gas outlet side. Thus, a temperature difference exerted in the length direction per sheet was calculated with respect to each of the positions. Moreover, in the honeycomb structural bodies of Comparative Examples 1 to 3, temperature measurements were carried out at a position 20 mm apart from the exhaust gas inlet side as well as at a position 20 mm apart from the exhaust gas outlet side. Then, a temperature difference exerted in the length direction of each honeycomb structural body was calculated.

Moreover, the above-mentioned collecting process of 8 g/l of particulates and regenerating process were repeated 100 times, and each of the honeycomb structural bodies was cut with a face perpendicular to the length direction of the honeycomb structural body and the cross sectional face was observed by using a scanning electron microscopic photograph (SEM) for any cracks occurring therein.

(3) Observation on Increase in Pressure Loss

Each of the filters according to the examples and comparative examples was placed in an exhaust passage of an engine to form an exhaust gas purifying device. Then, the engine was driven at the number of revolutions of 1200 min$^{-1}$ and a torque of 10 Nm for 100 minutes, and the amount of collected particulates and the pressure loss were measured.

(4) Porosity of Honeycomb Structural Body

The porosity of the honeycomb structural body was measured by using a weight porosity measuring method. The manufacturing conditions and results of evaluation are shown in Tables 1 and 2.

TABLE 1

| | Inorganic fiber material | Average fiber diameter (μm) | Average fiber length (mm) | Fiber direction |
|---|---|---|---|---|
| Example 1 | Alumina | 5 | 0.3 | Perpendicular to bottomed hole |
| Example 2 | Alumina | 5 | 0.3 | Perpendicular to bottomed hole |
| Example 3 | Alumina | 5 | 0.3 | Perpendicular to bottomed hole |
| Example 4 | Alumina | 5 | 10 | Perpendicular to bottomed hole |
| Example 5 | Alumina | 5 | 50 | Perpendicular to bottomed hole |
| Example 6 | Silica-alumina | 3 | 1.0 | Perpendicular to bottomed hole |
| Example 7 | Silica-alumina | 3 | 20 | Perpendicular to bottomed hole |
| Example 8 | Alumina | 5 | 0.3 | Perpendicular to bottomed hole |
| Example 9 | Alumina | 5 | 0.3 | Perpendicular to bottomed hole |
| Example 10 | Alumina | 5 | 0.3 | Perpendicular to bottomed hole |
| Example 11 | Alumina | 5 | 0.3 | Perpendicular to bottomed hole |
| Comparative Example 1 | Alumina | 5 | 0.3 | Parallel to bottomed hole |
| Comparative Example 2 | — | — | — | — |
| Comparative Example 3 | Alumina | 5 | 0.3 | Parallel to bottomed hole |

TABLE 2

| | Temperature difference exerted in honeycomb structural body upon regenerating | | Pressure loss (kPa) | | | |
|---|---|---|---|---|---|---|
| | Temperature difference exerted on one sheet located at a position 20 mm apart from exhaust gas inlet side (° C.) | Temperature difference exerted on one sheet located at a position 20 mm apart from exhaust gas outlet side (° C.) | Presence or absence of cracks | Initial pressure loss | Pressure loss after collection of 6 g/l | Porosity (%) | Degree of penetration (mm) |
| Example 1 | 1 | 2 | Absence | 10.3 | 21.9 | 90 | 2.0 |
| Example 2 | 1 | 2 | Absence | 10.3 | 23.1 | 92 | 2.0 |
| Example 3 | 1 | 2 | Absence | 10.3 | 23.4 | 87 | 2.0 |

TABLE 2-continued

| | Temperature difference exerted in honeycomb structural body upon regenerating | | | Pressure loss (kPa) | | | |
|---|---|---|---|---|---|---|---|
| | Temperature difference exerted on one sheet located at a position 20 mm apart from exhaust gas inlet side (° C.) | Temperature difference exerted on one sheet located at a position 20 mm apart from exhaust gas outlet side (° C.) | Presence or absence of cracks | Initial pressure loss | Pressure loss after collection of 6 g/l | Porosity (%) | Degree of penetration (mm) |
| Example 4 | 1 | 2 | Absence | 8.6 | 19.6 | 85 | 2.0 |
| Example 5 | 1 | 2 | Absence | 7.2 | 18.2 | 89 | 2.0 |
| Example 6 | 1 | 2 | Absence | 9.1 | 20.1 | 88 | 2.0 |
| Example 7 | 1 | 2 | Absence | 8.8 | 19.8 | 90 | 2.0 |
| Example 8 | 2 | 5 | Absence | 10.4 | 22.4 | 84 | 2.0 |
| Example 9 | 2 | 5 | Absence | 10.7 | 22.7 | 85 | 2.0 |
| Example 10 | 15 | 25 | Absence | 11.2 | 20.1 | 88 | 2.0 |
| Example 11 | 15 | 25 | Absence | 12.1 | 19.7 | 89 | 2.0 |
| Comparative Example 1 | 190 | | Presence | 11.4 | 29.4 | 87 | 1.0 |
| Comparative Example 2 | 170 | | Presence | 15.7 | 40.0 | 45 | 0 |
| Comparative Example 3 | 195 | | Presence | 11.6 | 30.1 | 85 | 0.9 |

Note)
In comparative Examples 1 to 3, temperature measurements were carried out at respective positions located 20 mm apart from the exhaust gas inlet side and 20 mm apart from the exhaust gas outlet side, and a temperature difference between the two positions was calculated, so that this value is determined as a temperature difference exerted in the honeycomb structural body upon regenerating.

As clearly indicated by the results shown in Tables 1 and 2, in the honeycomb structural body in accordance with each of the embodiments, with respect to inorganic fibers constituting the honeycomb structural body, more fibers are aligned along a face perpendicular to the forming direction of the through holes rather than aligned along a face in parallel with the forming direction of through holes (bottomed holes); therefore, in comparison with a honeycomb structural body according to Comparative Example 1 in which more fibers are aligned along the face in parallel with the forming direction of through holes (bottomed holes) and a honeycomb structural body (Comparative Example 2) formed by sintering ceramic particles, the particulates are allowed to reach inner portions of the honeycomb structural body.

FIGS. 6 and 7 are SEM photographs that show states inside the wall at a position 1.5 mm apart from the through hole exhaust gas flow-in side of each of the honeycomb structural bodies in accordance with Example 1 and Comparative Example 1. These photographs clearly show that in the honeycomb structural body of the example, particulates are allowed to reach even this portion, and collected, while in the honeycomb structural body of Comparative Example 1, particulates have not reached this portion. With respect to the honeycomb structural body according to Comparative Example 2, the corresponding figure is omitted.

Moreover, in the honeycomb structural body according to the example, since the porosity is made higher in comparison with the honeycomb structural body (Comparative Example 2) manufactured by sintering ceramic particles, the initial pressure loss and the pressure loss upon collection of 6 g/L are reduced.

As clearly indicated by the results shown in Table 2, in the honeycomb structural body according to each of the examples, the temperature difference exerted on one sheet-shaped matter upon regenerating was in a range from 1 to 25° C.

In contrast, in the honeycomb structural body according to each of the comparative examples, the temperature difference exerted in the honeycomb structural body upon regenerating was in a range from 170 to 195° C.

Consequently, as also shown in Table 2, in the honeycomb structural bodies according to the comparative examples, cracks were observed after the regenerating process; in contrast, in the honeycomb structural bodies according to the examples, no cracks were observed even after the regenerating process.

Moreover, in the honeycomb structural body according to the example, since the porosity was made higher in comparison with the honeycomb structural body (Comparative Example 2) manufactured by sintering ceramic particles, the initial pressure loss and the pressure loss upon collecting particulates were reduced.

Furthermore, in the honeycomb structural bodies according to Examples 10 and 11, there are irregularities formed on the surface of the wall portion so that the honeycomb structural body of this type clearly makes it possible to reduce the pressure loss after collection of particulates.

Figure 1:
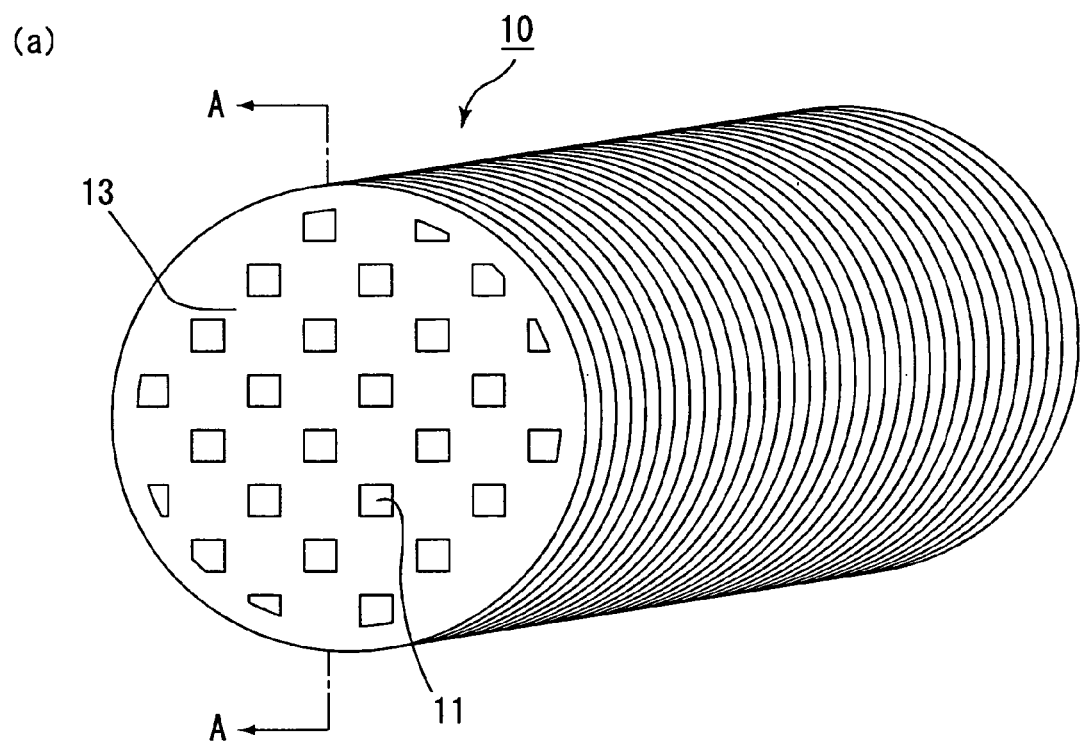
FIG. 1(a) is a perspective view that schematically shows a honeycomb structural body according to a first aspect of the present invention.
FIG. 1(b) is a cross-sectional view taken along line A-A of the honeycomb structural body shown in FIG. 1(a).
Figure 1:
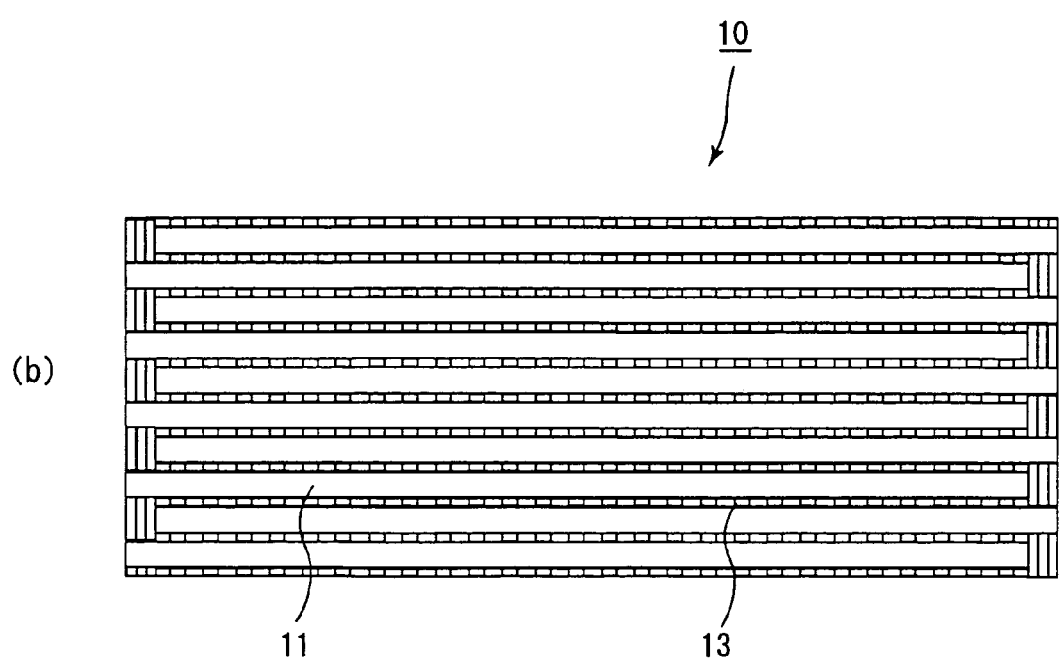
Figure 2:
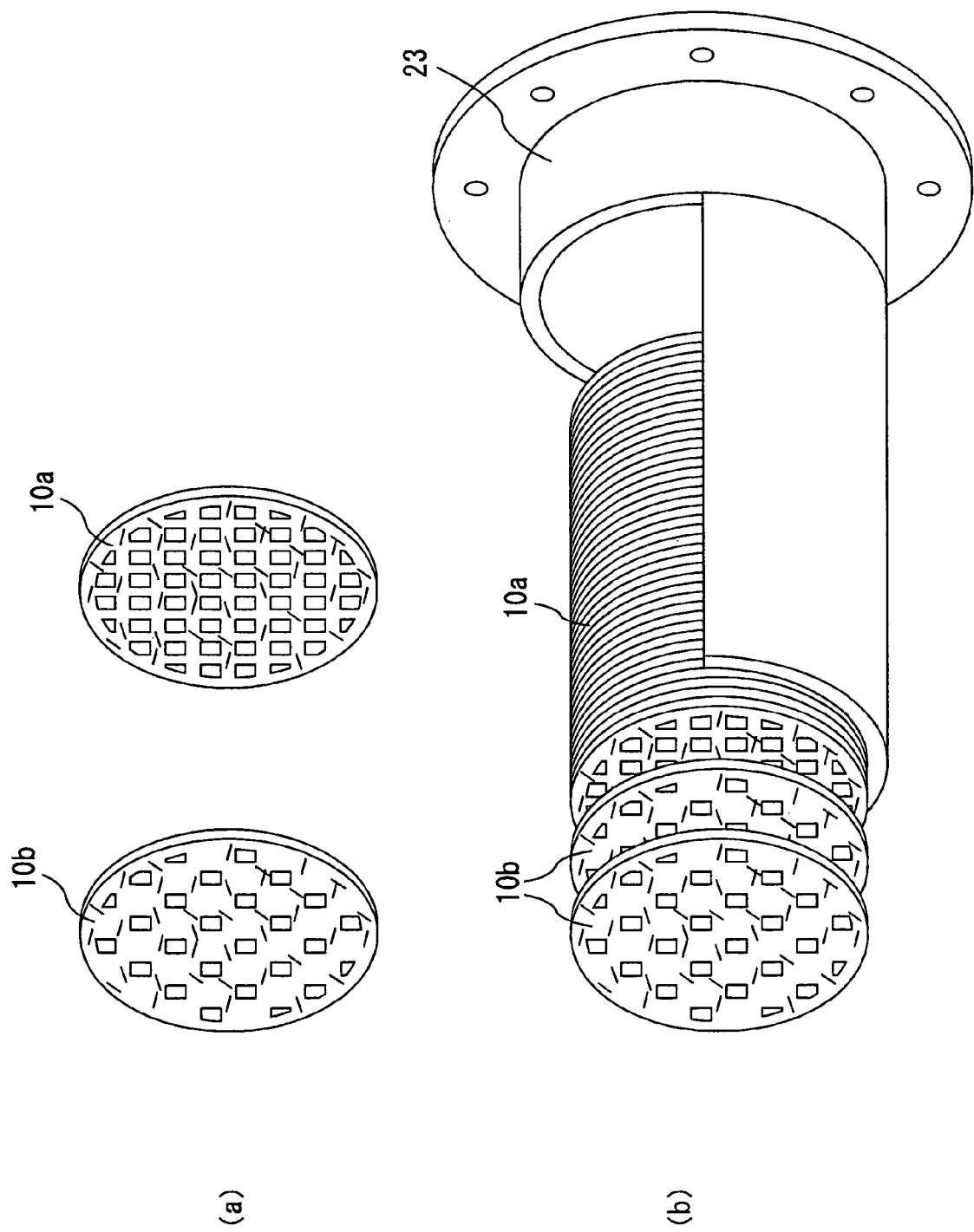
FIG. 2(a) is a perspective view that schematically shows one example of paper-making processed sheets, which constitute the honeycomb structural body according to the first aspect of the present invention.
FIG. 2(b) is a perspective view that shows a manufacturing process in which the honeycomb structural body is formed by laminating the paper-making processed sheets shown in FIG. 2(a).
Figure 3:
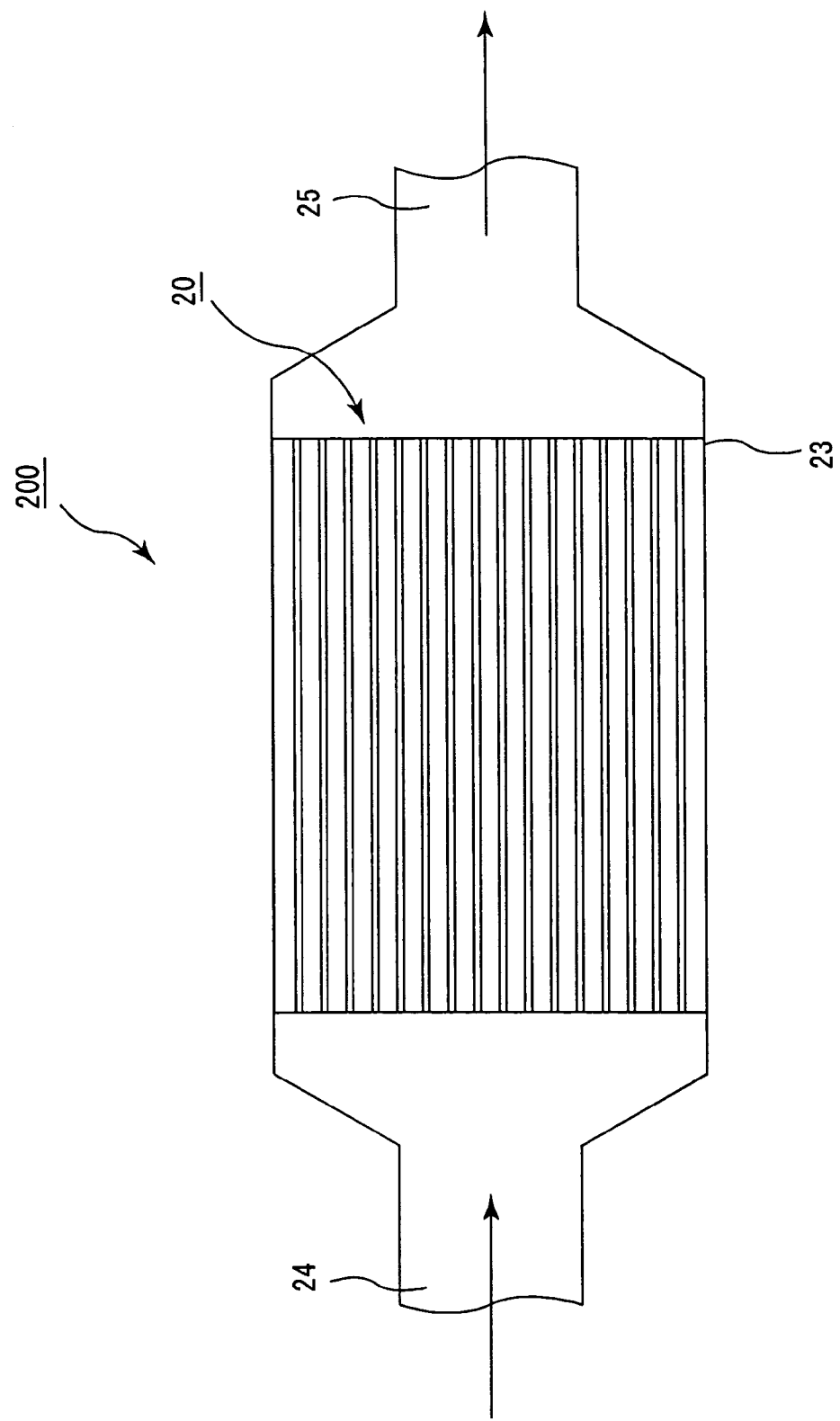
FIG. 3 is a cross-sectional view that schematically shows one example of an exhaust gas purifying device using the honeycomb structural body according to the first aspect of the present invention.
Figure 4:
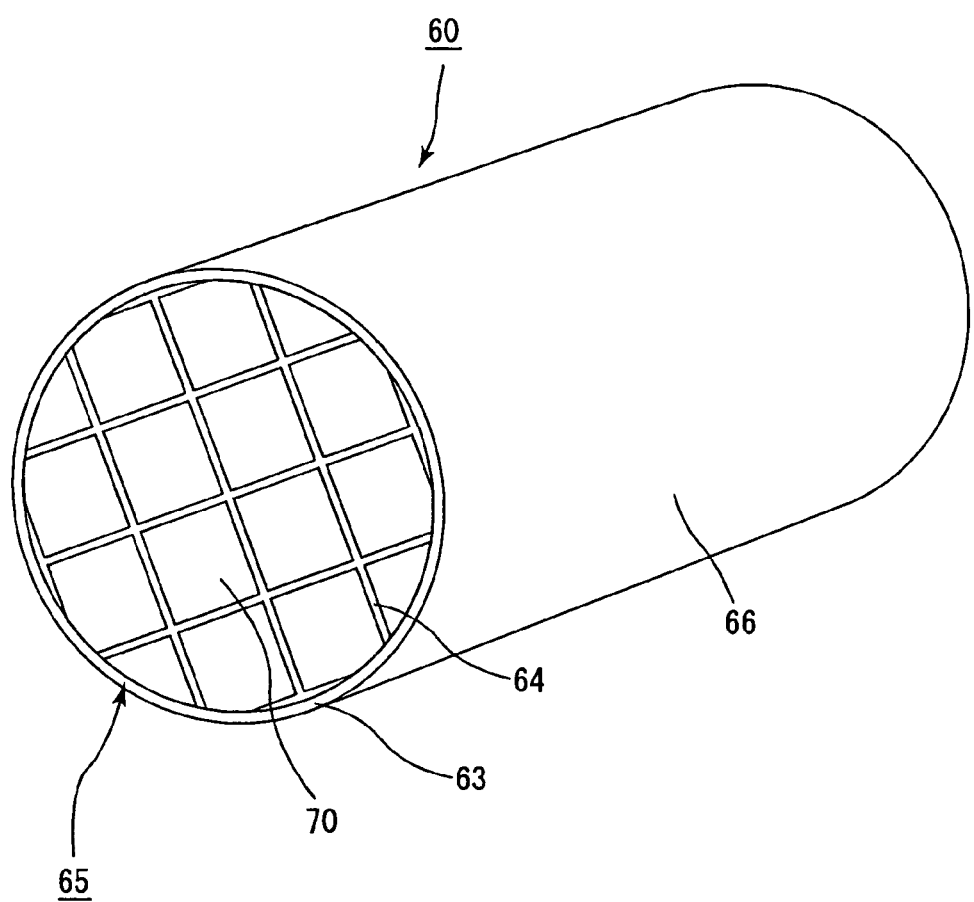
FIG. 4 is a perspective view that schematically shows a conventional honeycomb filter.
Figure 5:
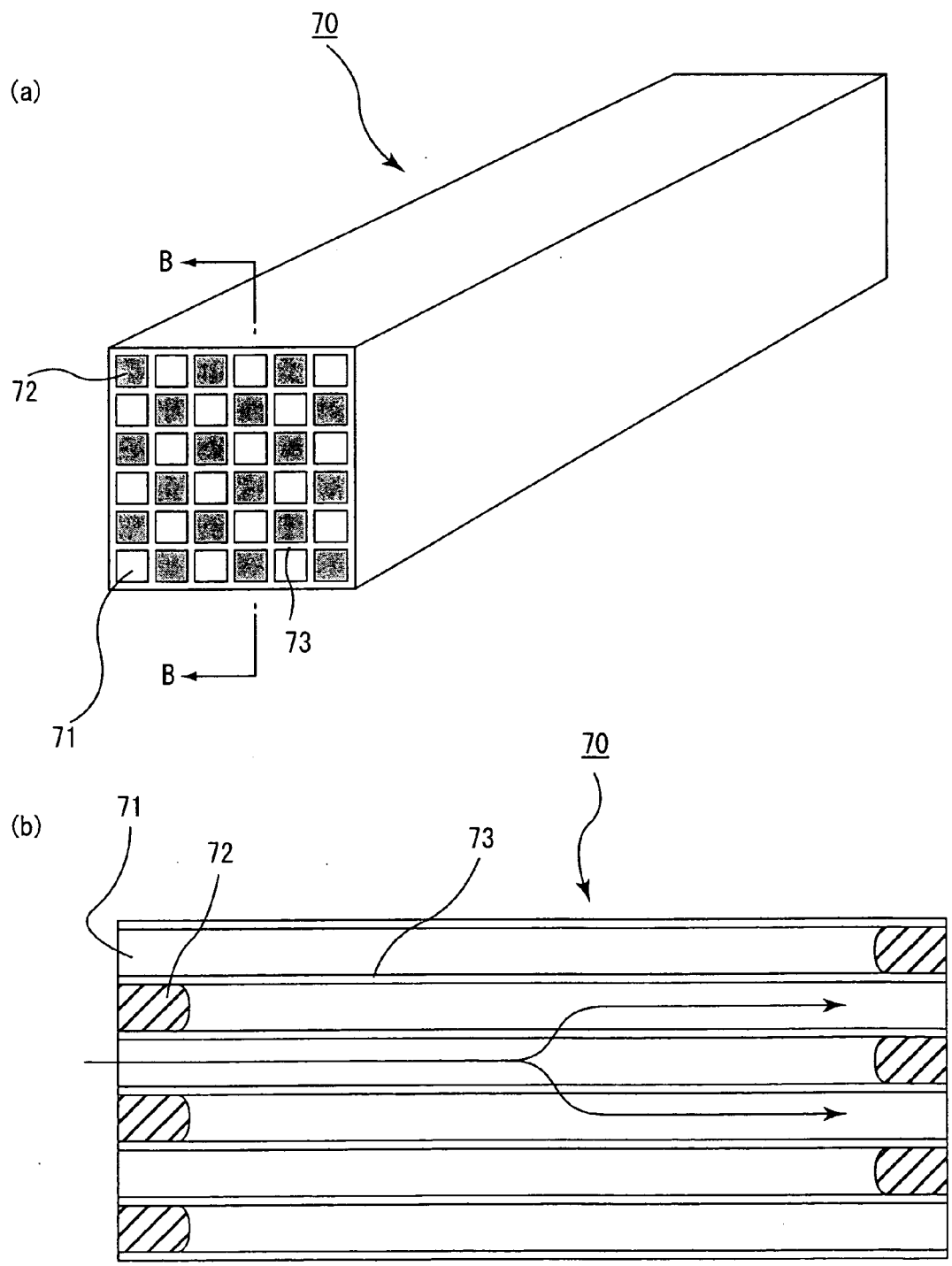
FIG. 5(a) is a perspective view that schematically shows a porous ceramic member that constitutes a honeycomb filter shown in FIG. 4.
FIG. 5(b) is a cross-sectional view taken along line B-B of the porous ceramic member shown in FIG. 5(a).
Figure 6:
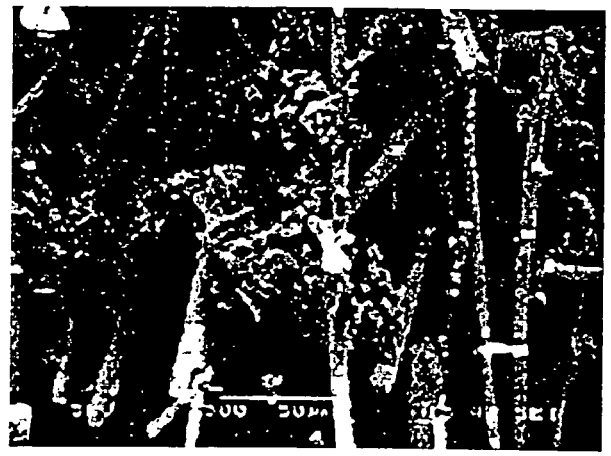
FIG. 6 is an SEM photograph that shows a state inside a through hole 1.5 mm apart from the opening of the honeycomb structural body according to Example 1.
Figure 7:
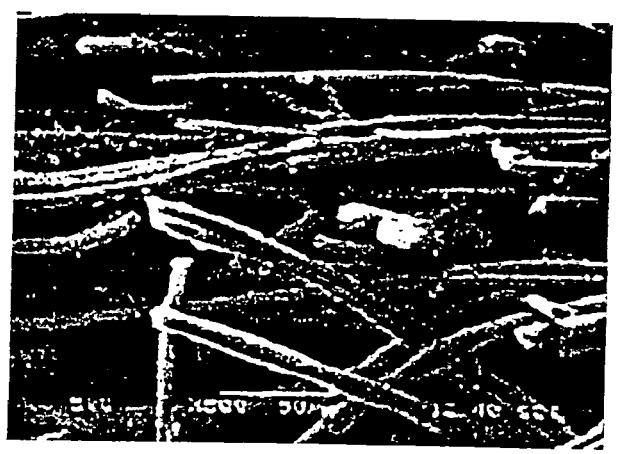
FIG. 7 is an SEM photograph that shows a state inside a through hole 1.5 mm apart from the opening of the honeycomb structural body according to Comparative Example 1.
Figure 8:
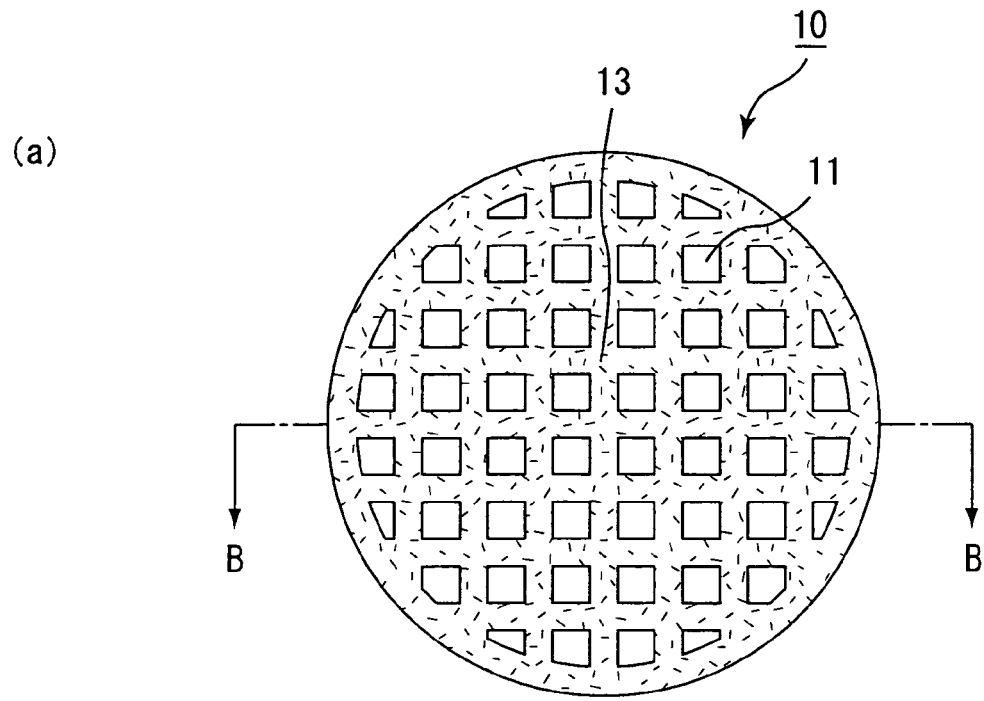
FIG. 8(a) is a front view that schematically shows a honeycomb structural body.
FIG. 8(b) is a cross-sectional view taken along line B-B of the honeycomb structural body shown in FIG. 8(a).
Figure 8:
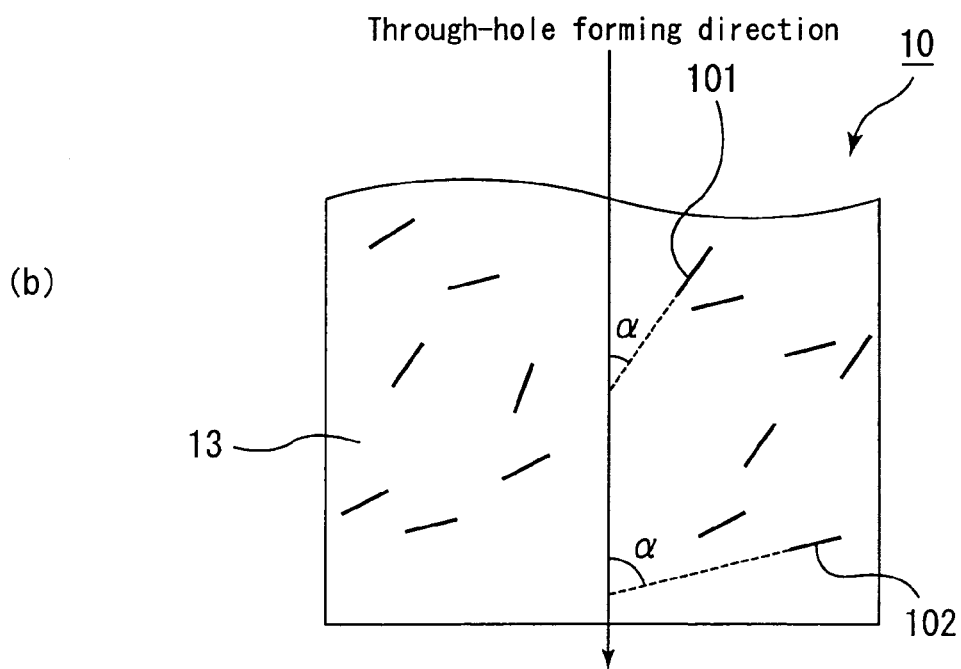
Figure 9:
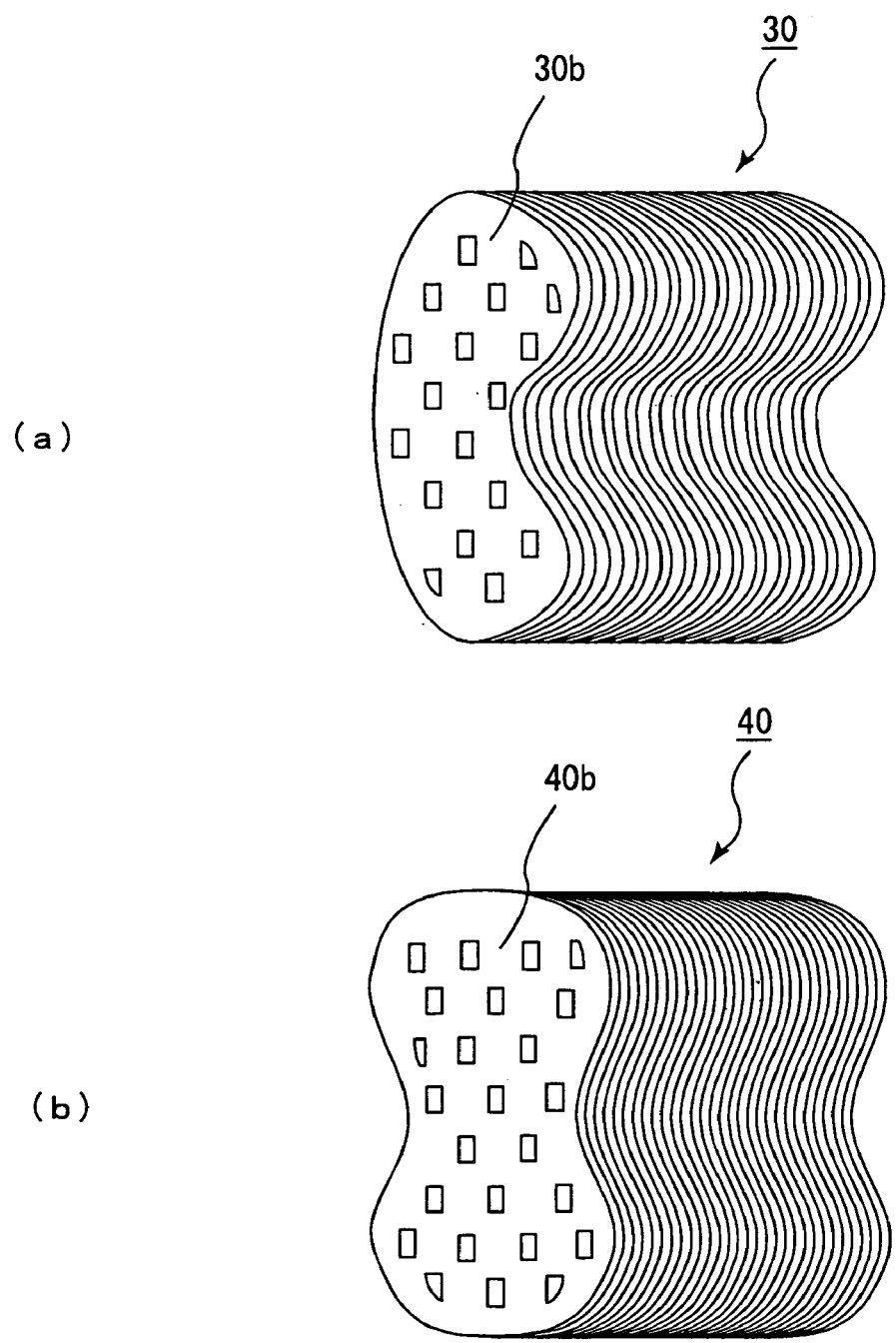
FIG. 9(a) is a perspective view that schematically shows another example of the honeycomb structural body according to the first aspect of the present invention.
FIG. 9(b) is a perspective view that schematically shows still another example of the honeycomb structural body according to the first aspect of the present invention.

EXPLANATION OF SYMBOLS 10 honeycomb structural body
10a, 10b paper-making processed sheet
11 bottomed hole (through hole)
13 wall portion
20 honeycomb structural body
23 casing
200 exhaust gas purifying device

The invention claimed is:

1. A pillar-shaped filter device for filtering or purifying a gas comprising:
 a honeycomb structural body comprising a plurality of inorganic fibers as a main constituent material, the honeycomb structural body having a plurality of through holes extending in parallel with one another in a length direction of the honeycomb structural body and a partition wall portion interposed between the through holes,
 wherein the plurality of inorganic fibers has more inorganic fibers aligned in a perpendicular direction with respect to a forming direction of the through holes rather than in a parallel direction with respect to the forming direction of the through holes.

2. The pillar-shaped filter device according to claim 1, wherein the honeycomb structural body comprising a plurality of sheet members laminated such that the through holes are formed by superposing a plurality of through holes in each of the sheet members on one another in the length direction of the honeycomb structural body.

3. The pillar-shaped filter device according to claim 1, wherein the plurality of through holes includes ones sealed at one end of the honeycomb structural body and ones sealed at the other end of the honeycomb structural body.

4. The pillar-shaped filter device according to claim 1, wherein the honeycomb structural body has a porosity in a range from 60 to 98 vol %.

5. The pillar-shaped filter device according to claim 1, further comprising a catalyst supported on the inorganic fibers.

6. The pillar-shaped filter device according to claim 1, wherein the honeycomb structural body is configured to filter or purify exhaust gases.

7. The pillar-shaped filter device according to claim 1, wherein the inorganic fibers are combined by one of an inorganic binder and an organic binder.

8. The pillar-shaped filter device according to claim 1, wherein the plurality of inorganic fibers comprises at least one type of ceramic fibers selected from the group consisting of silica-alumina fibers, mullite fibers, alumina fibers, silica fibers, aluminum nitride fibers, silicon nitride fibers, boron nitride fibers, titanium nitride fibers, silicon carbide fibers, zirconium carbide fibers, titanium carbide fibers, tantalum carbide fibers, and tungsten carbide fibers.

9. The pillar-shaped filter device according to claim 1, wherein the plurality of inorganic fibers comprises fibers comprising at least one type of ceramics.

10. A pillar shaped filter device for filtering or purifying a gas, comprising:
 a honeycomb structural body comprising a plurality of sheet members each of which comprising a plurality of inorganic fibers as a main constituent material, each of the sheet members having a plurality of through holes, the plurality of sheet members being laminated such that the through holes in the sheet members are superposed to form a plurality of through holes extending in parallel with one another in a length direction of the honeycomb structural body and a partition wall portion interposed between the through holes of the honeycomb structural body,
 wherein the through holes of the plurality of sheet members include different shapes such that the partition wall portion forms surfaces which have irregularities when the through holes of the honeycomb structural body are formed, the plurality of through holes of the honeycomb structural body includes ones sealed at one end of the honeycomb structural body and ones sealed at the other end of the honeycomb structural body.

11. The pillar-shaped filter device according to claim 10, wherein the honeycomb structural body comprising a plurality of sheet members laminated such that the through holes are formed by superposing a plurality of through holes in each of the sheet members on one another in the length direction of the honeycomb structural body.

12. The pillar-shaped filter device according to claim 10, wherein the honeycomb structural body has a porosity in a range from 60 to 98 vol %.

13. The pillar-shaped filter device according to claim 10, further comprising a catalyst supported on the inorganic fibers.

14. The pillar-shaped filter device according to claim 10, wherein the honeycomb structural body is configured to filter or purify exhaust gases.

15. The pillar-shaped filter device according to claim 10, wherein the plurality of inorganic fibers has more inorganic fibers aligned in a perpendicular direction with respect to a forming direction of the through holes of the honeycomb structural body rather than in a parallel direction with respect to the forming direction of the through holes of the honeycomb structural body.

16. The pillar-shaped filter device according to claim 10, wherein the inorganic fibers are combined by one of an inorganic binder and an organic binder.

17. The pillar-shaped filter device according to claim 10, wherein the plurality of inorganic fibers comprises at least one type of ceramic fibers selected from the group consisting of silica-alumina fibers, mullite fibers, alumina fibers, silica fibers, aluminum nitride fibers, silicon nitride fibers, boron nitride fibers, titanium nitride fibers, silicon carbide fibers, zirconium carbide fibers, titanium carbide fibers, tantalum carbide fibers, and tungsten carbide fibers.

18. The pillar-shaped filter device according to claim 10, wherein the plurality of inorganic fibers comprises fibers comprising at least one type of ceramics.

* * * * *